R. ELLIOTT.
Sleigh.

No. 112,566.

Patented Mar. 14, 1871.

Witnesses.
Tobias Witmer
Percy P. Kneass.

Inventor.
Robert Elliott
by John A. Wiedersheim
Atty

UNITED STATES PATENT OFFICE.

ROBERT ELLIOTT, OF CHESTER, PENNSYLVANIA.

IMPROVEMENT IN SLEIGHS.

Specification forming part of Letters Patent No. 112,566, dated March 14, 1871.

*To all whom it may concern:*

Be it known that I, ROBERT ELLIOTT, of Chester, in the county of Delaware and State of Pennsylvania, have invented new and useful Improvements in Sleighs; and I do hereby declare the following to be a clear and exact description of the nature thereof, sufficient to enable others skilled in the art to which my invention appertains to fully understand and use the same, reference being had to the accompanying drawings, making part of this specification, in which—

Figure 1:
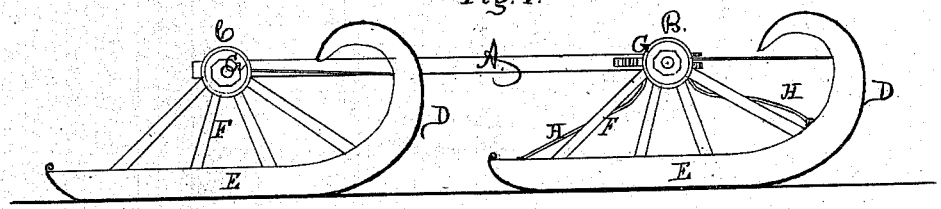
Figure 2:
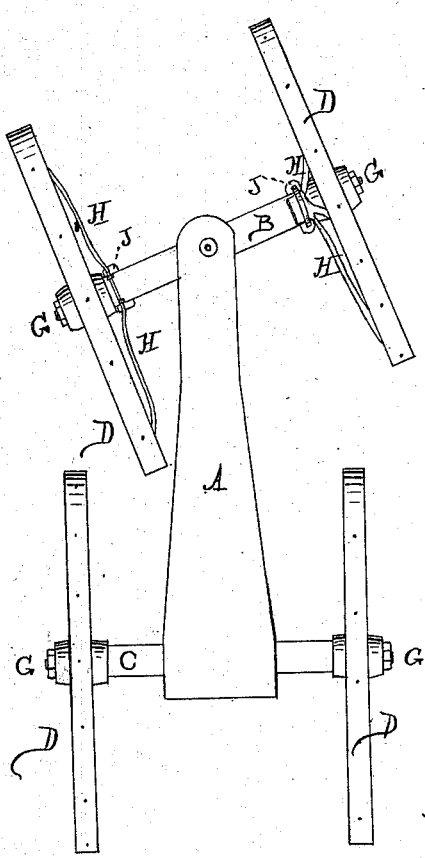

Figure 1 is a side view of the device illustrating my invention. Fig. 2 is a bottom view thereof.

Similar letters of reference indicate corresponding parts in the two figures.

My invention consists in sleigh-runners which are so constructed that they may be applied in place of wheels to the running-gear of a wagon. For this purpose each runner has secured to it a series of spokes which radiate from a hub which will readily fit on the axle when the wheel is removed, so that the running-gear of a wagon may support a wagon or sleigh body and be mounted on wheels or sleigh-runners, as most desirable or necessary. The runners which are placed on the front axle (having a pivotal movement, as is usual in wagons) are rigidly braced to the axle, while the runners on the rear axle swing freely thereon, whereby the runners will conform to any inequalities of the ground or road and there is no danger of upsetting.

Referring to the drawings. A represents a reach, to whose forward end is pivoted the front axle, B, and to its rear end is secured the hind axle, C, all of which form the running-gear of a wagon, and are of ordinary form and construction.

D D represent the sleigh-runners, which consist of the runners proper, E, to which are secured spokes F, which radiate from hubs G. These hubs are so constructed that when the wheels of the wagon are removed said hubs will occupy their places and fit nicely on the axles B C. Thus a wagon is easily converted into a sleigh, and when the latter is no longer required the wagon is quickly made to assume its own character. In order to render the sleigh effective and serviceable, I rigidly connect either pair of the runners D to its axle by means of braces H, which extend from the runners proper to the axle, where they are secured by clips or hooks J, or other fastenings, in any proper manner. The other pair of runners has its hubs fit freely on their axle, so as to give to any irregularity of the ground. Thus, one pair of the runners being fixed on the axle and the other permitted to oscillate, the sleigh is allowed to assume a safe level, regardless of the inequalities of the road, and without danger of upsetting. Besides this, there is no necessity of chains, rods, or other connections between the front and rear sets of runners, which is an important feature, since the swinging of the front axle for steering purposes is in no manner interfered with or limited.

The invention will be found to be simple, practical, and useful.

Having thus described my invention, what I claim as new, and desire to secure by Letters Patent, is—

1. The hubs G, in combination with the spokes F, attached directly to the sleigh-runners D, substantially as and for the purpose specified.

2. In combination with the foregoing, the running-gear A B C of two sets or pairs of sleigh-runners, one set being rigidly attached to one axle and the other set oscillating freely on the other axle, and operating together, substantially in the manner and for the purpose described.

3. The braces H, rigidly connecting the front axle, hubs, spokes, and its set of runners, substantially as described.

ROBERT ELLIOTT.

Witnesses:
 SAML. ULRICH,
 ROBT. CARDWELL.